US012785585B2

(12) United States Patent
Muszynski et al.

(10) Patent No.: US 12,785,585 B2
(45) Date of Patent: Nov. 3, 2026

(54) POWER CONVERTER SYSTEM

(71) Applicant: ABB Schweiz AG, Baden (CH)

(72) Inventors: Peter Muszynski, Helsinki (FI); Veli-Matti Leppänen, Helsinki (FI); Tero Viitanen, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 169 days.

(21) Appl. No.: 18/741,109

(22) Filed: Jun. 12, 2024

(65) Prior Publication Data

US 2024/0429832 A1 Dec. 26, 2024

(30) Foreign Application Priority Data

Jun. 21, 2023 (EP) .................................... 23180651

(51) Int. Cl.

*H02M 7/539* (2006.01)
*H02M 7/48* (2007.01)
*H02M 7/493* (2007.01)

(52) U.S. Cl.

CPC ......... *H02M 7/493* (2013.01); *H02M 7/4815* (2021.05); *H02M 7/539* (2013.01)

(58) Field of Classification Search

CPC .... H02M 7/493; H02M 7/4815; H02M 7/539; H02M 7/497; H02M 7/501; H02M 7/4818; H02M 7/4826; H02M 7/4811; H02M 7/5395; H02M 7/5388; H02M 7/5381; H02M 7/53873; H02M 7/53878

See application file for complete search history.

(56) References Cited

U.S. PATENT DOCUMENTS 7,068,525 B2 6/2006 Kraus et al.
8,432,714 B2 4/2013 Keronen et al.
(Continued)

FOREIGN PATENT DOCUMENTS

EP 524398 B1 8/1996
WO 2017079125 A1 5/2017

OTHER PUBLICATIONS

Tabrizi Gholamreza et al; Optimized Design Method and Control of an Auxiliary Resonant Commutated Pole Inverter for Two Level Photovoltaic Inverters; May 3, 2021; Retrieved forn Internet; 8 Pages.

(Continued)

*Primary Examiner* — Nguyen Tran
(74) *Attorney, Agent, or Firm* — Greenberg Traurig, LLP

(57) ABSTRACT

A power converter system including an auxiliary resonant commutated pole converter leg, particularly an ARCP half-bridge, and a resonant swing time controller for the ARCP converter leg. The resonant swing time controller is configured to control a resonant swing time duration of ARCP commutations to a reference value of the resonant swing time by means of a closed loop feedback of an actual resonant swing time duration. In an embodiment, the resonant swing time controller is configured to provide, based on an error between the actual resonant swing time duration and the reference value, control values to adjust a turn-on instant of at least one auxiliary switching device of the ARCP converter leg earlier or later in time so that resonant swing time duration of ARCP commutations is controlled towards the reference value.

15 Claims, 7 Drawing Sheets

(56) References Cited

U.S. PATENT DOCUMENTS

| | | | | |
|---|---|---|---|---|
| 2010/0254172 | A1* | 10/2010 | Hattori | H02M 7/53871 332/109 |
| 2019/0288595 | A1* | 9/2019 | Ali | H02M 1/126 |

OTHER PUBLICATIONS

Tabrizi Gholamreza et al; Influence of DC Supply Voltage Unbalances on the Performance of ARCP Inverters; 2022 24th European Conference on Power Electronics and Applications; EPE Association; Sep. 5, 2022; 9 Pages.

Zocher Markus et al; Auxiliary Resonant Commutated Pole Inverter (ARCPI) Operation Using online voltage measurements; 2022 IEEE Applied Power Electronics Conference and Exposition (APEC), IEEE, Mar. 20, 2022; 6 Pages.

European Search Report; Application No. EP23180651; Completed: Nov. 21, 2023; 3 Pages.

Protiwa F et al; A 20 KVA Auxiliary Resonant Commutated Pole Converter. Odesign and Practical Experiences; EPE '95: 6th. European Conference on Power Electronics and Applications. Sevilla, Sep. 19-21, 1995; [European Conference on Power Electronics and Applications], Brussels, EPE Association; 6 Pages.

* cited by examiner

Fig. 4A
Fig. 4B
Fig. 4C
Fig. 4D
Fig. 4E
Fig. 4F
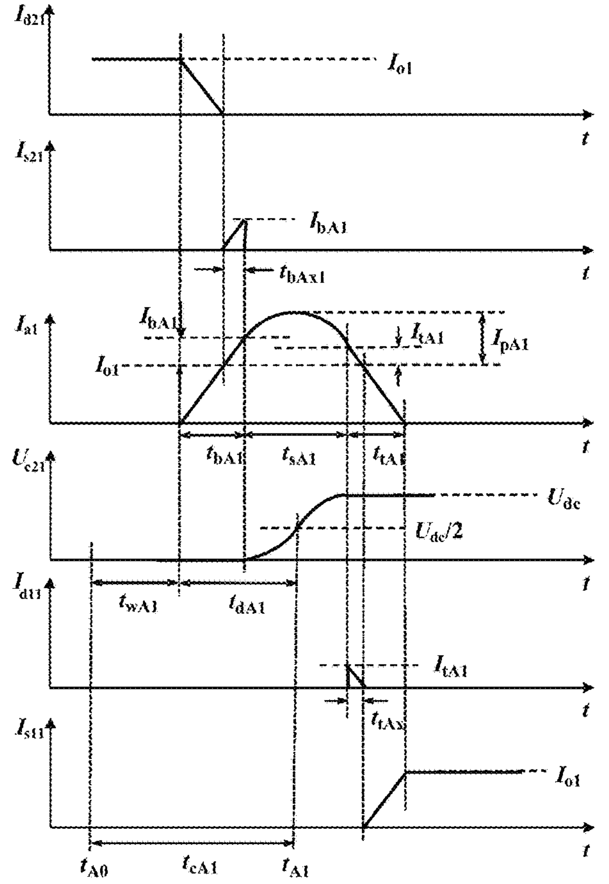
Fig. 5A
Fig. 5B
Fig.5C
Fig. 5D
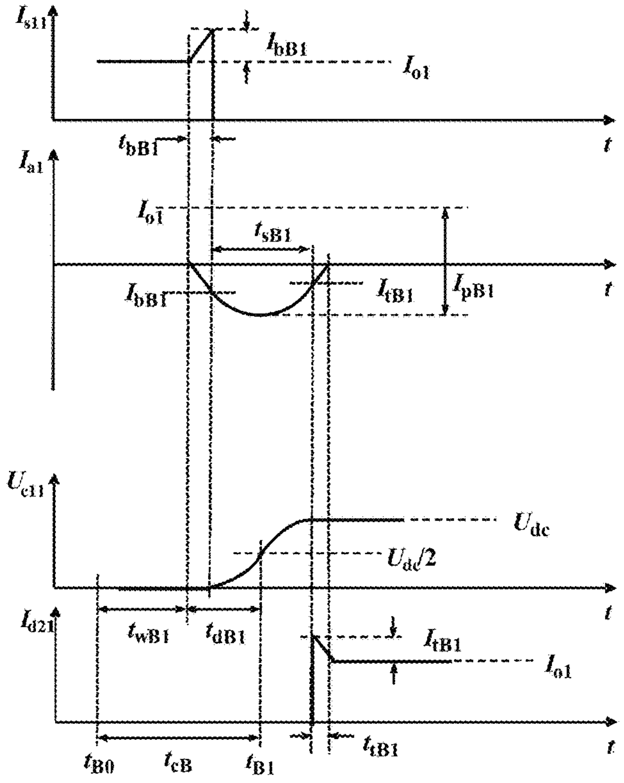

POWER CONVERTER SYSTEM

TECHNICAL FIELD

The present invention relates to a power converter, particularly to parallel-connected power converters, and more particularly to current sharing of parallel-connected power converters.

BACKGROUND OF THE INVENTION

A dc-ac or ac-dc converter, also known as an inverter or a rectifier respectively, converts power from dc to ac or ac to dc system at desired voltages and frequencies. The inverter therefore can be operated as an adjustable-frequency voltage source. The dc power input to the inverter may be obtained from an existing power supply network through a rectifier or from a battery, fuel cell, photovoltaic array, etc. The filter capacitor(s) across the input terminals of the inverter provides a fairly constant dc-link voltage. A configuration of ac to de rectifier and dc to ac inverter may be called a dc-link converter.

In some situations, a power inverter with an increased output power capability is implemented by connecting a plurality of inverter units in parallel with one another to feed the same load The parallel-connected inverter units may receive simultaneous and similar control signals to provide a desired output of the power inverter. However, due to parameter differences of switch components and differing impedances in parallel branches, the currents between the units can be unequal in magnitude. Such a current imbalance can stress the components unevenly and wear switch components with higher current prematurely. A higher current in a switch component can result in a higher dissipated power and, further, a higher temperature of the component.

Current imbalance has been addressed by modifying switch control pulses in order to balance the currents. The control pulses can be modified by delaying a turn-on time instant for a switch that has the highest current or by delaying turn-off time instants for a switch that has the smallest current. One such method is disclosed in EP0524398. In these solutions, the conducting times of the parallel components are modified to equalize stresses to the switch components on the basis of measured inverter unit currents.

U.S. Pat. No. 8,432,714 discloses a method for balancing load between parallel-connected inverter modules wherein temperatures of each output leg of each inverter module are determined and the switching instructions for one or more of the parallel inverter modules are modified for controlling the temperatures of the output legs.

WO2017/079125A1 discloses a method wherein the output voltages of all the parallel connected power devices are measured, and the measuring results are used for mitigating timing differences during output voltage state changes caused e.g. by gate driver circuit and switching component parameter tolerances.

U.S. Pat. No. 7,068,525 discloses a method of operating multiple parallel-connected inverters by regulating the individual currents of the inverters separately.

SUMMARY

An object of the present invention to provide an improved power converter system, particularly a system having two or more parallel-connected converter legs. The power converter system is recited in the independent claim 1. Preferred embodiments are disclosed in the dependent claims.

An aspect of the invention is a power converter system, comprising an auxiliary resonant commutated pole (ARCP) converter leg, particularly an ARCP half-bridge, a resonant swing time controller for the ARCP converter leg, the resonant swing time controller being configured to control a resonant swing time duration of ARCP commutations to a reference value of the resonant swing time by means of a closed loop feedback of an actual resonant swing time duration.

In an embodiment, the resonant swing time controller is, configured to provide, based on an error between the actual resonant swing time duration and the reference value, control values to adjust a turn-on instant of at least one auxiliary switching device of the ARCP converter leg earlier or later in time so that resonant swing time duration of ARCP commutations is controlled towards the reference value.

In an embodiment, the resonant swing time controller is configured to form an integral of the error to provide the control value.

In an embodiment, the resonant swing time controller is configured to vary the control values around a nominal control value based on the error, the nominal control value preferably corresponding to about a midpoint of a desired control range of the resonant swing time.

In an embodiment, the resonant swing time controller is configured to adjust a turn-on instant of at least one auxiliary switching device of the ARCP converter leg earlier or later relative to a nominal turn-on instant of the at least one auxiliary switching device.

In an embodiment, the resonant swing time controller is configured to provide the control values based on ARCP Mode A commutations and to apply the same control values for both ARCP Mode A commutations and ARCP Mode B commutations.

In an embodiment, the resonant swing time controller is configured to measure the actual resonant swing time duration from switching instants of main switching devices of the ARCP converter leg in ARCP Mode A commutations, preferably from gating signals of the main switching devices.

In an embodiment, the resonant swing time controller is configured to calculate the resonant swing time reference based on an ARCP Mode A boost current and a dc-link voltage of the ARCP converter leg.

In an embodiment, the resonant swing time controller is configured to define the resonant swing time reference based on an actual measured dc-link voltage of the ARCP converter leg.

In an embodiment, the power converter system comprises a plurality of ARCP converter legs and a plurality of resonant swing time controllers, one for each ARCP converter leg, and wherein the resonant swing time controllers control the resonant swing time duration towards essentially same reference value in all ARCP converter legs of the converter system.

In an embodiment, the power converter system comprises a plurality of ARCP converter legs connected in parallel between a common system and a common ac system or two common dc systems, wherein commutations of the parallel-connected ARCP converter legs are initiated by simultaneous commutation commands, a plurality of resonant swing time controllers, one for each parallel-connected ARCP converter leg, and wherein the resonant swing time controllers control the resonant swing time duration towards essentially the same reference value in all parallel-connected ARCP converter legs of the converter system.

In an embodiment, the power converter system comprises two or more ARCP converters, each of the ARCP converters comprising one or more ARCP converter legs, wherein the parallel-connected ARCP converter legs are the corresponding ARPC converter legs of the two or more converters connected in parallel.

In an embodiment, each of said ARCP converter legs comprises:

a series connection of at least two main switching devices between a positive dc-link potential and a negative dc-link potential to alternatively connect the positive and negative dc-link potential to a converter leg output, and a series connection of a resonant inductance and at least one bidirectional auxiliary switch between said converter leg output and a dc-link neutral point.

BRIEF DESCRIPTION OF THE DRAWINGS

In the following the invention will be described in greater detail by means of exemplary embodiments with reference to the accompanying drawings, in which

FIGS. 4A-4F are diagrams illustrating an example of mode A commutation;

FIGS. 5A-5D are diagrams illustrating an example of mode B commutation;

DETAILED DESCRIPTION

A dc-ac or ac-dc converter, also known as an inverter or a rectifier respectively, converts power from dc to ac or ac to dc power system at desired voltages and frequencies. Further, a dc-dc converter, such as a dc chopper, converts power from dc to dc power system. Although embodiments are described using inverters and inverter systems as examples, the invention is similarly applicable to rectifiers and rectifier systems as well as dc-dc converters. Inverter and rectifier can be exactly similar in structure and the control operations can be similar, the difference being the direction of a power flow. When a converter operates as an inverter (dc/ac converter), it converts the power from a dc system to an ac system, i.e., the ac side of the converter is referred as an output side and the dc side is considered as an input side. When a converter operates as a rectifier (ac/dc converter), it converts power from an ac system to a dc system, i.e., the ac side of the converter is considered as an input side and the dc side is considered as an output side. Further, connecting ac/dc and dc/dc converters in back-to-back configuration, i.e., dc-sides connected together, between two ac systems, one of the converters is operating in rectifier mode and the other in inverter mode, depending on the power flow direction. Operation modes of the converters may vary during the operation, as power flow may vary.

Figure 1:
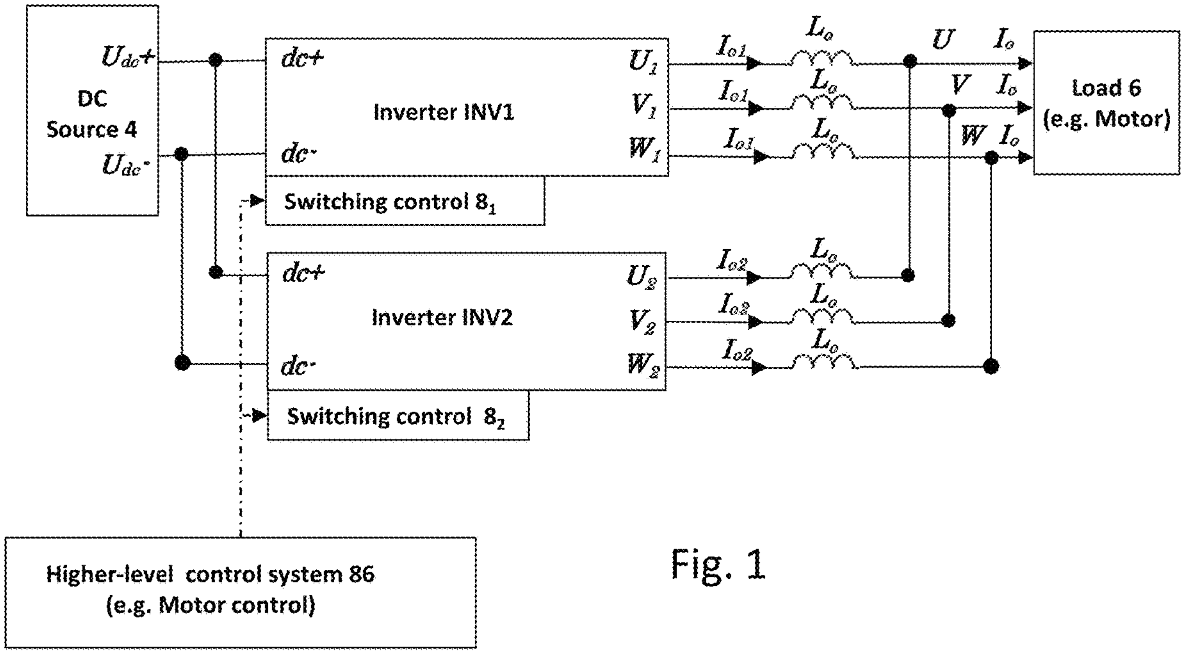
FIG. 1 is a block diagram that schematically illustrates an exemplary inverter system having a plurality of parallel-connected inverters.

FIG. 1 shows a block diagram that schematically illustrates an exemplary inverter system having a plurality of (i.e., two or more) inverters INV1, INV2, . . . , INVN connected in parallel from their DC side (e.g., DC link) terminals (e.g., dc+, dc−) and their AC side terminals (e.g., $U_1$, $V_1$, $W_1$, $U_2$, $V_2$, $W_2$). In the illustrated example, the inverters INV1 and INV2 are three-phase inverters providing three phase outputs $U_1$, $V_1$, $W_1$ and $U_2$, $V_2$, $W_2$, but it should be appreciated that parallel-connected inverters may be implemented as single-phase inverters, or generally include any number of inverter phases or inverter legs. The parallel-connected inverters are fed by a common DC voltage source 4 with voltage Udc, and inverters are feeding a common AC load 6. A typical application area of the parallel-connected inverters fed by a common DC voltage source 4 is an electric motor drive having an AC electric motor as a common load 6. It should be noted that the load 6 does not have to be of AC type. It can be DC as well, for example a battery energy storage or similar. Parallel connected inverter legs apply to this invention similarly, regardless of the load type. There is a non-zero impedance at each phase output of each inverter, represented by inductances Lo in FIG. 1. The output inductances Lo may be intentionally implemented (e.g., a coil, a choke, etc.) or it may be just some leakage impedance of practical components and materials, such as cabling. The output inductances Lo may be substantially equal, but it must not necessarily be so. The corresponding phase outputs $U_1$, $U_2$, $V_1$, $V_2$, and $W_1$, $W_2$ of the parallel-connected inverters INV1 and INV2 are connected through the output inductances Lo to the common phase outputs U, V, and W, respectively. The corresponding phase outputs $U_1$, $U_2$, $V_1$, $V_2$, and $W_1$, $W_2$ of the parallel-connected inverters INV1 and INV2 may be connected together right after the output inductances Lo, and a single cable or multiple cables per phase U, V, and W may be used to connect the phase outputs to the load 6. Alternatively, each parallel-connected inverters INV1 and INV2 can be connected by means of its own cabling to the load 6, and the phase outputs $U_1$, $U_2$, $V_1$, $V_2$, and $W_1$, $W_2$ can be connected in parallel first at the terminals of the load 6. Output phase current Io of each phase U, V, W supplied to the load 6 is formed by combining phase output currents $I_{o1}$ and $I_{o2}$ of the respective phase outputs $U_1$, $U_2$, $V_1$, $V_2$, and $W_1$, $W_2$ of the parallel-connected inverters INV1 and INV2. The common DC supplied parallel-connected inverter modules INV1 and INV2 can be controlled to act like one high power inverter. This can be achieved by controlling the parallel inverter units with essentially same control commands.

Each inverter module INV1 and INV2 may have one or more bridge circuits (a full bridge or a half bridge), one bridge circuit for each inverter phase or inverter leg. The bridge circuits of the same phase of different inverter modules are connected in parallel with one another. Each bridge circuit can include a plurality of electronic switching elements or devices (e.g., insulated gate bipolar transistors (IGBTs) that operate in a switch mode, meaning that that they are controlled to transition from a blocking state (OFF state) to a conducting state (ON state), and vice-versa, by providing control pulses (often called switching control signals or gating signals) at a high switching frequency. In a PWM modulation scheme, the width of control pulses provided to the control inputs of the switching devices is varied to provide a desired output of the inverter. The parallel-connected inverters INV1 and INV2 may have a common switching control (e.g., as a part of the higher level control 86 in FIG. 1) that provides switching signals or gating signals to operate switching devices of all inverters, or each parallel-connected inverter INV1 and INV2 may have a dedicated switching control unit 81 and 82 that provides switching signals or gating signals to operate switching devices of the respective inverter, as illustrated in FIG. 1. Alternatively, the control may be distributed among a common switching control unit and inverter module-specific switching control units. In the latter cases, the inverter modules may be normal inverter modules (i.e., that can be used as single units) that can be connected in parallel as such. In embodiments, the switching control(s) 81 and 82 of the parallel-connected inverter modules INV1 and INV2 may be controlled by a higher-level control system 86 with simultaneous and essentially similar control signals or commands.

In embodiments, the higher-level control system 86 may be an electric motor control system or similar. It can also include a common PWM generation function (for example, a PWM modulator) for all system elements and phases.

Electronic switching devices, e.g., IGBTs, have a finite switching time, i.e. they cannot instantly switch from the conductive to the blocking state and vice versa. During this transition interval (commutation), the switch neither completely blocks nor fully conducts, and therefore, neither the voltage across the switch nor the current through the switch is zero. In other words, there is a considerable overlap between voltage and current waveforms. This simultaneous presence of voltage across the switch and current through it means that, during this overlapping period, power is being dissipated within the device. This power loss, called "a switching loss", reduces efficiency of the inverter, and when dissipated in the switch causes a major thermal stress on the switching device. The ability of a switching device to remove heat is limited. As the heat load increases, temperature rises which, in turn, degrades performance. Soft-switching techniques aim to eliminate the switching losses by forcing a zero-voltage or a zero-current condition on the switch during a switching event. Switching at zero-voltage crossing is called zero-voltage switching (ZVS) whereas switching at zero-current crossing is called zero-current switching (ZCS). The auxiliary resonant commutated pole (ARCP) inverter is one of the most promising approaches for soft-switching inverters and has distinct potential benefits in a motor drive application. The ARCP inverter can be implemented using various topologies, which all perform essentially similarly. The output voltage wave form during commutation can be shaped to be motor friendly via suitable resonant circuit parameter selections. The stress in motor insulation and bearings is thus reduced. The basic configuration and operation of ARCP is described, for example, an article "The auxiliary resonant commutated pole converter", IEEE-IAS Conference Proceedings 1990, pp. 1228-35, and in U.S. Pat. No. 5,047,913 by R. W. De Doncker et al.

According to an aspect of the invention, the inverter system is an auxiliary resonant commutated pole (ARCP) inverter system, comprising a plurality of (i.e., two or more) ARCP inverters INV1, INV2, . . . , INVN connected in parallel from their DC side (e.g. DC link) input terminals and their AC side output terminals (e.g., $U_1$, $V_1$, $W_1$, $U_2$, $V_2$, $W_2$). In embodiments, an ARCP inverter comprises series-connected dc-link capacitances of equal size between the negative (N) and the positive (P) dc-link rails of the dc-link side of the inverter. At a midpoint, called a neutral point (NP), of capacitances there is provided a neutral point potential $U_{NP}$ that essentially corresponds to half of the voltage Udc between the dc rails. Each phase of the inverter is associated with at least one resonant capacitor to force zero-voltage turn-off switching conditions. Further, an auxiliary branch comprising a resonant inductor and auxiliary switching device(s) is connected between the neutral point and a phase output to operate under zero current switching conditions. In the ARCP commutation is accomplished through the auxiliary circuitry in a finite amount of time. The auxiliary circuit is only used when the output is required to commutate from one voltage rail to the other. In order to ensure that the inverter output voltage at least reaches the positive and negative dc rail voltages during each resonant commutation cycle, a boost current is added to the resonant current by appropriately controlling the conduction times of the auxiliary switching devices. A predetermined boost current level in the inductor adds sufficient energy to the resonant operation to ensure that the output voltage attempts to overshoot the respective converter antiparallel diode and clamping the output voltage to the respective rail voltage. Ideally, the main switches turn on and off in a zero-voltage condition, and the auxiliary switch(es) in zero-current condition, which reduce the occurring switching losses. Consequently, the switching frequency can be increased without a considerable loss penalty. Low acoustic noise of such a drive is appreciated in many applications. High switching frequency also enables higher fundamental output frequencies with low distortion, making the ARCP topology attractive for high-speed drive applications.

Figure 2:
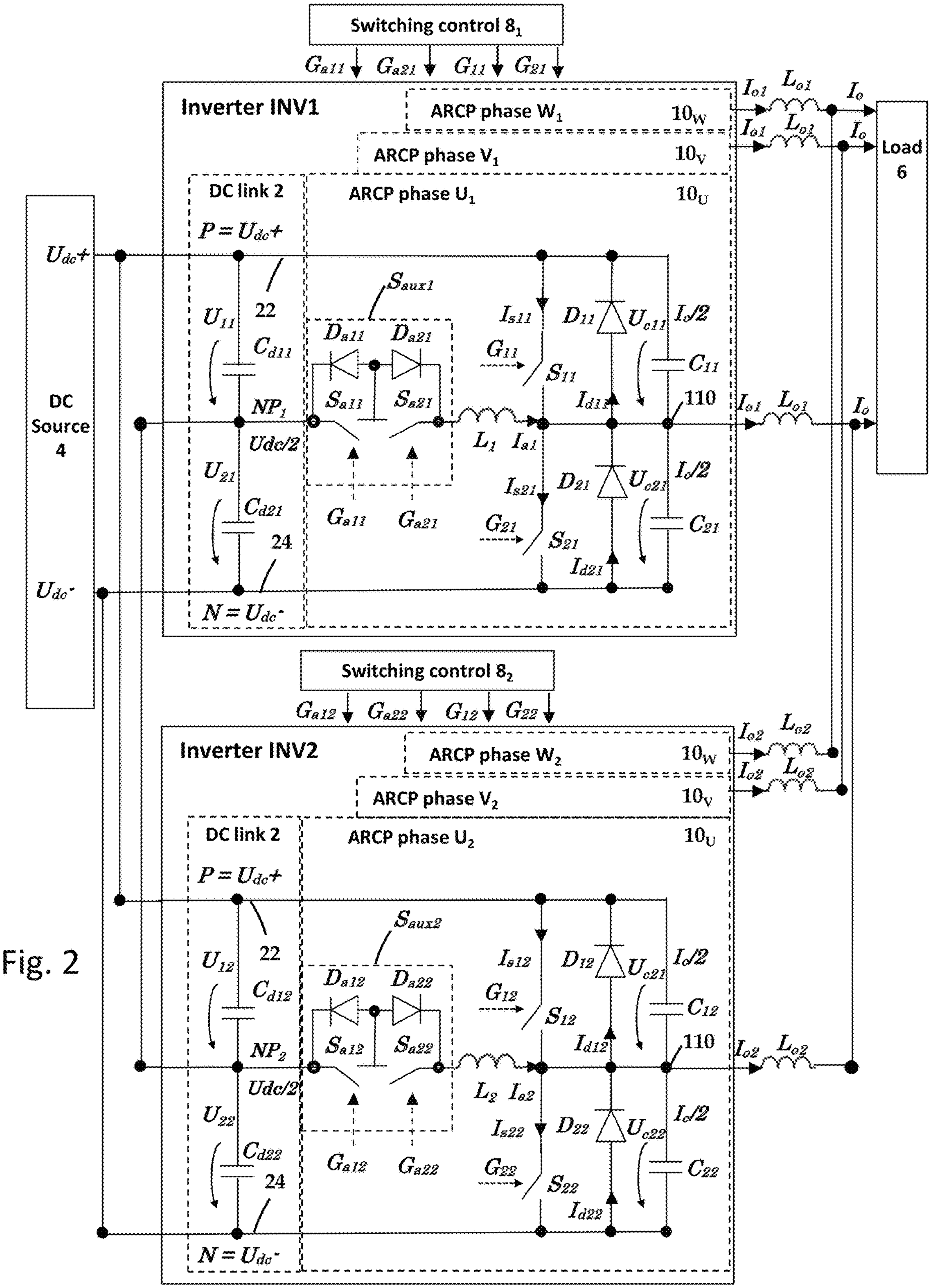
FIG. 2 is a schematic block diagram of an exemplary ARCP inverter system having a plurality of parallel-connected inverters.

The schematic of an exemplary ARCP inverter system having a plurality of (i.e., two or more) inverters INV1, INV2, . . . , INVN connected in parallel is illustrated in FIG. 2 and described herein in order to alleviate comprehending operation and configuration of embodiments of the invention in relation to an exemplary basic ARCP. It is not intended to limit embodiments of the invention to the described and illustrated exemplary ARCP(s) with only two parallel inverters. It shall be appreciated that the current sharing control according to embodiments of the invention is universally applicable to any type of ARCP inverters and their derivates and modifications regardless the specific design, configuration, and operation variations of an inverter from a basic ARCP inverter.

The parallel-connected ARCP inverters INV1 and INV2 may preferably be identical modules having the same configuration and operation. The exemplary ARCP inverter INV1 illustrated in FIG. 2 includes a DC-link 2 comprising a first dc-link rail 22, and a second de-link rail 24, a first dc-link capacitor $C_{d11}$ coupled with the first de-link rail 22 and a de-link midpoint, called a neutral point NP1, and a second dc-link capacitor $C_{d12}$ coupled with the second dc-link rail 24 and the neutral point NP1. During operation, the first dc-link rail 22 is at a first voltage, so called positive (P) dc-link potential, and the second dc-link rail 24 is at a second voltage lower than the first DC voltage, so called negative (N) dc-link potential, and the dc-link midpoint NP1 is at a midpoint voltage, so called neutral point voltage $U_{NP}$. The capacitances of the dc-link capacitors $C_{d11}$ and $C_{d21}$ are substantially equal, for example $C_{d11}=C_{d21}=2C_{dc}$, so that the voltages $U_{11}$ and $U_{21}$ provided across the dc-link capacitors $C_{d1}$ and $C_{d2}$ series-connected between the dc-link rails 22 and 24 are substantially equal, i.e. a half of a dc-link voltage $U_{dc}=U_{11}+U_{21}$ between the dc-link rails 22 and 24. Thus, also the neutral point voltage or potential $U_{NP}$ essentially corresponds to half of the voltage $U_{dc}$, in other words $U_{NP}=U_{dc}/2$. The exemplary ARCP inverter INV2 includes a similar DC link 2 having dc-link rails 22 and 24, dc-link capacitors $C_{d21}$ and $C_{d22}$, voltages $U_{21}$ and $U_{22}$, and dc-link midpoint $NP_2$.

The dc-link rails 22 of the parallel-connected ARCP inverters (positive dc-link potentials P) are connected to each other and to a first voltage terminal $U_{dc+}$ of the common DC power source 4. The de-link rails 24 of ARCP inverter modules (negative dc-link potentials N) are connected to each other and to a second voltage terminal $U_{dc-}$ of the common DC power source 4. Further, the neural points NP1 and NP2 of the parallel-connected ARCP inverter modules may be connected to each other as shown in FIG. 2. The connection of the neutral points NP1 and NP2 is not essential to this invention, and they may as well be not connected to each other. The common dc power input to the parallel-connected ARCP inverter modules INV1 and INV2 may be obtained from any kind of a dc power source 4, such as from an existing power supply network through a rectifier, or from a battery, fuel cell, photovoltaic array, etc. It shall be appreciated that dc-link 2 may be provided in a number of forms and may have a number of voltages and other attributes. It shall also be appreciated that the voltage difference between positive and negative dc-link rails is flexible, depending on how the dc-link 2 is charged or how the dc-link 2 is discharged by the connected circuits. For example, some embodiments may use a front-end isolation transformer and rectifier connected to the dc-link with the positive and negative rails floating and the differential voltage typically in the range of 50V-1500V, but in principle in other voltages outside this range as well. In other embodiments, the positive rail, mid-point, or negative rail may be grounded to earth. Preferably, the positive and negative rails are balanced. For example, if the dc-link neutral point NP is at 0 VDC, de-link rail 22 would be at a positive voltage (e.g., in the range of +25 VDC to +500 VDC, the range of in the range of +150 VDC to +400 VDC or other positive voltage ranges) and dc-link rail 24 would be at a negative voltage corresponding to the positive voltage (e.g., in the range of −25 VDC to −500 VDC, the range of in the range of −150 VDC to −400 VDC or other negative voltage ranges corresponding to the other positive voltage ranges). It shall be appreciated that the foregoing examples are few of many voltage magnitudes and polarities that may be present in or associated with the operation of dc-link 2. It shall be additionally appreciated that the voltage magnitudes of the foregoing examples may be subject to fluctuation, margins of error, tolerance, and other variations and may not be rigidly fixed to the precise example magnitudes stated. It shall be further appreciated the term bus may be utilized in place of the term link such that, for example, references to a dc-link are understood to encompass a dc-bus and vice versa.

The exemplary ARCP inverters INV1 and INV2 illustrated in FIG. 2 may be three-phase bridge ARCP inverters including a power section $\mathbf{10}_U$, $\mathbf{10}_V$, and $\mathbf{10}_W$ for each phase or inverter leg $U_1$, $U_2$, $V_1$, $V_2$, $W_1$ and $W_2$, respectively. Operation and configuration of the inverters INV1 and INV2 are illustrated and described in more detail primarily with respect to one phase or inverter leg $U_1$ and $U_2$ herein, but the other phases or inverter legs $V_1$, $V_2$, $W_1$ and $W_2$ of the inverters INV1 and INV2 can have identical operation and configuration. In the ARCP inverter INV1, the power sections $\mathbf{10}_U$, $\mathbf{10}_V$, and $\mathbf{10}_W$ of inverter legs $U_1$, $V_1$ and $W_1$ may be connected to the positive dc-link rail 22, the neutral point NP1, and the negative dc-link rail 24 of the common dc-link 2, and thereby to the negative (N), the neutral point (NP) and the positive (P) dc-link potentials, as illustrated in FIG. 2. The output node 110 of each power section $\mathbf{10}_U$, $\mathbf{10}_V$, and $\mathbf{10}_W$ is connected to the corresponding phase of a load 6, such as an ac motor or ac grid or any applicable electric load, via a non-zero impedance (presented generally by an output inductance Lot herein), which can consist of the impedance of connecting cable or busbar and it can also have additional elements if needed. In the ARCP inverter INV2, the power sections $\mathbf{10}_U$, $\mathbf{10}_V$, and $\mathbf{10}_W$ of inverter legs $U_2$, $V_2$ and $W_2$ may be connected to the common dc-link 2 of the inverter INV2 in a similar manner as in the inverter INV1. The phase output node 110 of each power section $\mathbf{10}_U$, $\mathbf{10}_V$, and $\mathbf{10}_W$ of the inverter INV2 is connected to the corresponding phase of the ac load 6 via a non-zero impedance (presented generally by an output inductance $L_{o2}$ herein), and thereby each phase output of the inverter INV2 is connected in parallel with the corresponding phase output of the inverter INV1. It should be appreciated that although a three-phase ARCP inverter is illustrated as an example herein, an ARCP inverter may be implemented as a single-phase inverter, or generally include any number of inverter phases or inverter legs. Moreover, although a half-bridge ARCP inverter is illustrated as an example herein, the ARCP inverter may have other configurations, particularly a full-bridge configuration.

The exemplary half-bridge power section $\mathbf{10}_U$ of the ARCP inverter INV1 illustrated in FIG. 2 includes a pair of main or power switching devices $S_{11}$ and $S_{21}$ coupled in parallel to the dc-link rails 22 and 24 of the dc-link 2. The first main switching device $S_{11}$ may have a first terminal electrically coupled to the positive dc-link rail 22 and a second terminal electrically coupled to an output node 110. The second main switching device $S_{21}$ having a first terminal coupled to output node 110 and a second terminal coupled to the negative dc-link rail 24. Across the first main switching device $S_{11}$ between the positive dc-link rail 22 and the output node 110 is connected a first antiparallel diode $D_{11}$, and across the second main switching device $S_{21}$ between the output node 110 and the negative dc-link rail 24 is connected a second antiparallel diode $D_{21}$. Further, a first resonant capacitor $C_{11}$ is operationally connected (i.e., directly or via additional components, such as an active or passive damping circuit series connected with the resonant capacitor) in parallel with the first main switching device $S_{11}$, and a second resonant capacitor $C_{21}$ is operationally connected in parallel with the second main switching device $S_{21}$. More generally, there may be one or more resonant capacitors connected in such manner that at least one terminal of the resonant capacitor(s) is connected to one of the dc-link rails (P, NP, N) and the other terminal(s) is (are) operationally connected to the phase output node 110. The first main switching device $S_{11}$ is operable to turn on and turn off, and thereby to respectively connect and disconnect the dc-link rail 22 and the output node 110, in response to control signal(s) $G_{11}$ received from a control and driver circuitry, such as an inverter-specific ARCP switching controller 81 illustrated in FIG. 2. The second main switching device $S_{21}$ is operable to turn on and turn off, and thereby to respectively connect and disconnect the de-link rail 24 and the output node 110, in response to control signal(s) $G_{21}$ received from the control and driver circuitry, such as the ARCP switching controller 81. All power sections $\mathbf{10}_U$, $\mathbf{10}_V$, and $\mathbf{10}_W$ of inverter legs $U_1$, $V_1$ and $W_1$ in the ARCP inverter INV1 may be controlled by the same inverter-specific switching controller $\mathbf{8}_1$. Similarly, the exemplary half-bridge power section $\mathbf{10}_U$ of the ARCP inverter INV2 illustrated in FIG. 2 includes a pair of main or power switching devices $S_{12}$ and $S_{22}$, a first antiparallel diode $D_{12}$, and a first resonant capacitor $C_{12}$, a second antiparallel diode $D_{22}$, a second resonant capacitor $C_{22}$, and switching control signals $G_{12}$ and $G_{22}$ from a control and driver circuitry, such as an inverter specific ARCP switching controller $\mathbf{8}_2$. All power sections $\mathbf{10}_U$, $\mathbf{10}_V$, and $\mathbf{10}_W$ of inverter legs $U_2$, $V_2$ and $W_2$ in the ARCP inverter INV2 may be controlled by the same inverter-specific switching controller $\mathbf{8}_2$. In embodiments, the switching devices $S_{11}$, $S_{12}$, $S_{21}$ and $S_{22}$ may be an insulated-gate bipolar transistor (IGBT), or another type of semiconductor switching device, such as an integrated gate-commutated thyristor (IGCT), a metal-oxide-semiconductor field-effect transistor (MOSFET), or a silicon carbide (SiC) MOSFET to name several examples.

In operation, when the first main switch $S_{11}/S_{12}$ is turned on (to a conductive state), a first switch current $I_{s11}/I_{s12}$ can flow between the dc-link rail 22 and the output node 110. Similarly, when the second main switching device $S_{21}/S_{22}$ is turned on (to a conductive state), a second switch current $I_{s21}/I_{s22}$ can flow between the output node 110 and the dc-link rail 24. On the other hand, when the first main switching device $S_{11}/S_{12}$ is turned off (to a non-conductive state), the first switch current $I_{s11}$ will not flow in the switch-forward direction between the dc-link rail 22 and the output node 110, although a current $I_{d11}/I_{d12}$ may flow in the switch-reverse direction through the first anti-parallel diode $D_{11}/D_{12}$ of the first main switching device $S_{11}/S_{12}$. Similarly, when the second main switching device $S_{21}/S_{22}$ is turned off (to a non-conductive state), the second switch current $I_{s21}/I_{s22}$ will not flow in the switch-forward direction between the output node 110 and the dc-link rail 24, although a current $I_{d21}/I_{d22}$ may flow in the switch-reverse direction through the anti-parallel diode $D_{21}/D_{22}$ of the second switching device $S_{21}/S_{22}$. Thus, by turning on and off and closing the first main switching device $S_{11}/S_{12}$ and the second main switching device $S_{21}/S_{22}$, the output voltage at the output node 110 will be controlled or commutated to be either the voltage P from the dc-link rail 22 or the voltage N from the dc-link rail 24. The purpose of the resonant capacitors $C_{11}/C_{12}$ and $C_{21}/C_{22}$ is to limit the voltage slew rate of the output node; this ensures that the voltages $U_{c11}/U_{c12}$ and $U_{c21}/U_{c22}$ across the main switching devices $S_{11}/S_{12}$ and $S_{21}/S_{22}$ do not significantly change during turn-off such that the main switching devices are turned off at essentially zero-voltage.

The exemplary half-bridge power section $\mathbf{10}_U$ of the ARCP inverter INV1 illustrated in FIG. 2 further includes an auxiliary circuit comprising a resonant inductor $L_1$ and a bidirectional auxiliary switch $S_{aux1}$ connected in series between the neutral point $NP_1$ and the output node 110. The auxiliary switch $S_{aux1}$ is operable to turn on and turn off, and thereby to respectively connect and disconnect the neutral point and the output node 110, in response to control signals received from the control and driver circuitry, such as the ARCP switching controller $\mathbf{8}_1$. The auxiliary switch $S_{aux1}$ can behave like a bidirectional thyristor: it can be triggered into conduction, and it turns off if or before the current tries to reverse its direction. In embodiments, the bidirectional auxiliary switch $S_{aux1}$ may be implemented with a pair of ordinary switching devices connected back-to-back, for example in a common-emitter or common-collector configuration and provided with anti-parallel diodes. FIG. 2 illustrates an exemplary auxiliary switch $S_{aux1}$ comprising a first auxiliary switching device San and a second auxiliary switching device $Sa_{21}$ in a common-emitter series connection, a first anti-parallel diode $Da_{11}$ connected across the first auxiliary switching device San, and a second antiparallel diode $Da_{21}$ connected across the second auxiliary switching device $Sa_{21}$. One of the two auxiliary switching devices San and $Sa_{21}$ is turned on and conducting at a time, as is one of the two antiparallel diodes Dan and $Da_{21}$, in response to control signals $Ga_{11}$ and $Ga_{21}$ received from a control and driver circuitry, such as an ARCP switching controller 81 illustrated in FIG. 2. In each case, the auxiliary current $I_{a1}$ will flow through one diode in series with one switch. The auxiliary switching devices in the auxiliary circuit are turned on and off at zero-current. When the first auxiliary switching device $Sa_{11}$ is turned on and the second switching device $Sa_{21}$ is turned off, the auxiliary current $I_{a1}$ will flow in one direction through $Sa_{11}$ and $Da_{21}$. When the first auxiliary switching device $Sa_{11}$ is turned off and the second switching device $Sa_{21}$ is turned on, the auxiliary current $I_{a1}$ will flow in the opposite direction through $Sa_{21}$ and $Da_{11}$. The auxiliary circuit is only used when the output node 110 is required to commutate from one voltage rail to the other. The auxiliary circuit functions by creating a pulse of current that, in combination with the resonant capacitors, is used to slew the output voltage on the output node 110. Similarly, the exemplary half-bridge power section $\mathbf{10}_A$ of the ARCP inverter INV2 illustrated in FIG. 2 further includes an auxiliary circuit comprising a resonant inductor $L_2$ and a bidirectional auxiliary switch $S_{aux2}$ connected in series between the neutral point $NP_2$ and the output node 110. In embodiments, the auxiliary switch $S_{aux2}$ may be implemented with a pair of ordinary switches and antiparallel diodes in a similar manner as the auxiliary switch $S_{aux1}$. FIG. 2 illustrates an exemplary auxiliary switch $S_{aux2}$ comprising a first auxiliary switching device $Sa_{12}$ and a second auxiliary switching device $Sa_{22}$ in a series connection, a first anti-parallel diode $Da_{12}$ connected across the first auxiliary switching device $Sa_{12}$, and a second antiparallel diode $Da_{22}$ connected across the second auxiliary switching device $Sa_{22}$. One of the two auxiliary switching devices $Sa_{12}$ and $Sa_{22}$ is turned on and conducting at a time, as is one of the two antiparallel diodes $Da_{12}$ and $Da_{22}$, in response to control signals $Ga_{21}$ and $Ga_{22}$ received from a control and driver circuitry, such as an ARCP switching controller 82 illustrated in FIG. 2.

The ARCP switching control $\mathbf{8}_1 \ldots \mathbf{8}_n$ illustrated in FIGS. 1 and 2 refers generally to any control functions, logic, hardware, firmware, software, etc. required to control main and auxiliary switching devices in the ARCP inverter leg(s) based on a PWM signal or PWM signals. Given a PWM signal, a standard hard-switching inverter does not need too much additional logic to form a complete inverter drive system. At a minimum, the direct PWM signal is sent to one switch while the complement of the PWM input signal is sent to the other switch in that phase. The ARCP on the other hand, requires more than the PWM modulation and control: it requires an additional more complex control, particularly due to the auxiliary circuit and the auxiliary switch(es).

Figure 3:
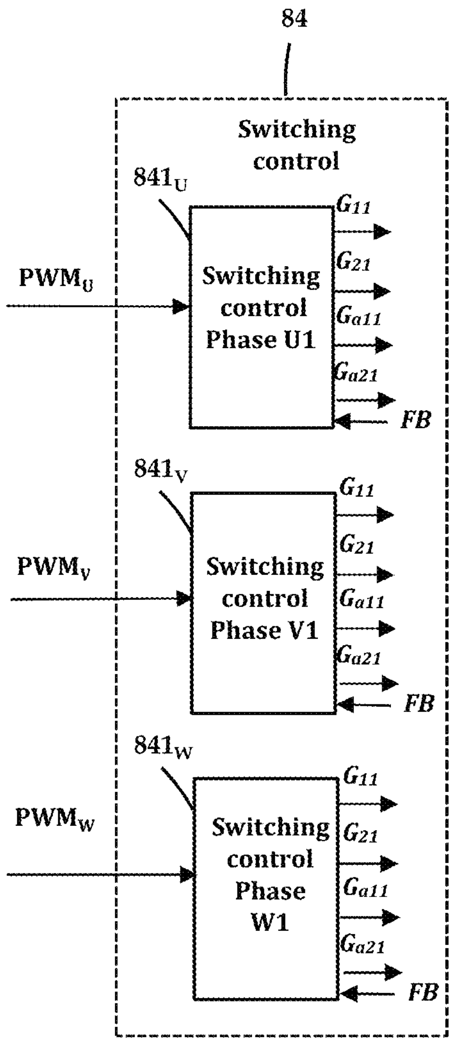
FIG. 3 is a schematic block diagram of an ARCP switching controller.

FIG. 3 is a schematic block diagram of an exemplary embodiment of an ARCP switching controller $\mathbf{8}_1$ having a ARCP control function 84. In the illustrated example, the ARCP control 84 may include a dedicated ARCP control module $\mathbf{841}_U$, $\mathbf{841}_V$, and $\mathbf{841}_W$ adapted to provide control signals, such as $G_{11}$, $G_{21}$, $G_{a11}$ and $G_{a21}$ to each ARCP inverter leg $U_1$, $V_1$ and $W_1$, respectively, based on a respective PWM signal $PWM_U$, $PWM_V$ and $PWM_W$ received from a PWM modulator. The PWM modulator may be common for all parallel-connected inverters INV1 . . . . INVn (e.g., as a part of the higher-level control 86 in FIG. 1, and the PWM commands may be sent via a communication link to the inverters. The ARCP control 84, or the respective ARCP control module $\mathbf{841}_U$, $\mathbf{841}_V$, and $\mathbf{841}_W$, may have to provide for instance the following functions for each inverter leg $U_1$, $V_1$ and $W_1$: Activation of the correct auxiliary switch before commutating the main switches, controlling the boost time, ensuring that the main switches are switched at essentially zero-voltage, ensuring that the auxiliary switches are switched at zero-current, initially starting the switching sequence upon power up, etc. Depending on a selected ARCP control strategy, various sensing feedbacks FB may be required to implement the control algorithms, such as feedback from main switch zero-voltage sensors, auxiliary switch zero-current sensors, an auxiliary current sensor, an output (load) current sensor, a dc-link voltage sensor, a dc-link capacitor sensor(s), a neutral point voltage sensor, etc. In embodiments, a leg-specific current balancing may be included in the switching control 84, and particularly in the leg-specific switching control modules 841A, 841B, and 841C. In embodiments, a leg-specific current balancing may be implemented by means of Field Programmable Gate Arrays (FPGAs).

As used herein, the mode of commutating the output current $I_o$ from a diode to a switch (e.g., the current $I_{o1}$ from the diode $D_{21}$ to the switch $S_{11}$) in ARCP is called mode A and the mode of commutating the output current $I_o$ from a switch to a diode (e.g., the current $I_{o1}$ from the switch Si to the diode $D_{21}$) is called mode B, when the auxiliary circuit is involved in commutation and a boost current is provided. The mode of commutating high output current $I_o$ from a switch to diode, when the output current Io itself is sufficient to drive the output voltage from one dc-link rail to another and the auxiliary circuit is not involved, is called mode O herein.

Mode A commutation: If the output current $I_o$ is positive (Io>0) and the output voltage $U_o$ swings from the potential N (the dc-link 24) to the potential P (the dc-link 22), the lower diodes $D_{21}$ and $D_{22}$ commutate their currents ($I_{d21}$ and $I_{d22}$, respectively) to upper switches $S_{11}$ and $S_{12}$, respectively. If the output current $I_o$ is negative (Io<0) and the output voltage $U_o$ swings from the potential P (the dc-link 22) to the potential N (the dc-link 24), the upper diodes $D_{11}$ and $D_{12}$ commutate their currents ($I_{d11}$ and $I_{d12}$, respectively) to lower switches $S_{21}$ and $S_{22}$, respectively.

Mode B commutation: If the output current $I_o$ is positive (Io>0) and the output voltage $U_o$ swings from the potential P (the dc-link 22) to the potential N (the dc-link 24), the upper switches $S_{11}$ and $S_{12}$ commutate their currents to lower diodes $D_{21}$ and $D_{22}$, respectively. If the output current $I_o$ is negative (Io<0) and the output voltage $U_o$ swings from the potential N (the dc-link 24) to the potential P (the dc-link 22), the lower switches $S_{21}$ and $S_{22}$ commutate their currents to diodes $D_{11}$ and $D_{12}$, respectively.

In the following, examples of typical ARCP commutation in modes A and B are briefly described for a single phase, e.g., the ARCP phase $V_1$, of the ARCP inverter INV1. The commutation modes A and B of the corresponding the ARCP phase $V_2$ of the ARCP inverter INV2 are similar.

As an example of the mode A, a commutation of the positive output current $I_{o1}$ (Io>0) from the lower diode $D_{21}$ to the upper main switch $S_{11}$ and the output voltage $U_o$ from N to P will described with reference to FIGS. 4A-4F.

The diode $D_{21}$ is conducting the output current $I_{o1}$ ($=I_{d21}$), the diode $D_{21}$ supplying the output current $I_o$ (FIG. 4A) and switches $S_{11}$, $S_{a11}$ and $S_{a21}$ not conducting (turned off); during the commutation $S_{21}$ turns off and $S_{11}$ turns on. It shall be appreciated that FIGS. 4A-4F illustrate timing in the basic ARCP operation without a resonance swing time control according to embodiments of the invention. The effect of embodiments of the invention on the timing, especially on the turn-off time of the switch $S_{21}$ will be described further below.

The command for commutation arrives at time instant $t_{Ao}$. In the basic ARCP, the auxiliary switch San is turned on (at zero current) after a time interval $t_{wA1}$, which marks the start of the nominal boosting interval $t_{bA1}$. The neutral point voltage $U_{NP1}$ is applied across the resonant inductor $L_1$, which causes the auxiliary current $I_{a1}$ through the resonant inductor $L_1$ to ramp up linearly (FIG. 4C), and the current $I_{d21}$ in diode $D_{21}$ decreases accordingly as $I_{d21}=I_{o1}-I_{a1}$ (FIG. 4A). In order to turn the diode $D_{21}$ off, the auxiliary current $I_{a1}$ must increase to the level of the output current $I_{o1}$ and even beyond (by a boosting current $I_{bA1}$), so that finally $I_{a1}=I_{o1}+I_{bA1}$. The boosting current portion $I_{bA1}$ of the total inductor current $I_{a1}$ is diverted to the switch $S_{21}$ parallel to the diode $D_{21}$ (FIG. 4B) while the load 6 takes its own, i.e., the output current $I_{o1}$.

In the basic ARCP, the switch $S_{21}$ is turned off after a time interval $t_{bA1}$ (FIG. 4B), which marks the end of the nominal boosting interval $t_{ba1}$, and the commutation swing of the output voltage $U_{c21}$ from N (zero) to P (the full $U_{dc}$) starts. The boosting current $I_{bA1}$ must be large enough to force the output potential swing from N to P, charging the capacitor $C_{21}$ and discharging the capacitor $C_{11}$. If there is a slight unbalance of the dc link voltage halves so that $U_{21}<U_{11}$, more boosting current is needed, and if $U_{21}>U_{11}$, less boosting current suffices.

The interval for the swing of $U_{C21}$ from zero to $U_{dc}$ has duration $t_{sA1}$.

$$t_{sA1} = \sqrt{L_1 C}\left[\cos^{-1}\left(\frac{U_{c21} - U_{dc}}{\sqrt{L_1/C}\, I_{pA}}\right) - \beta\right], \tag{1}$$

where $I_{pA1}$ is the peak value of the resonant part of the inductor current $$I_{pA1} = \sqrt{\frac{CU_{c21}^2}{L_1} + I_{BA1}^2}, \tag{2}$$

β is a phase angle $$\beta = \sin^{-1}(I_{bA}/I_{pA}), \tag{3}$$

and $C=C_{11}+C_{21}$ in the exemplary topology B shown in FIG. 2. The voltage change rate average is $du/dt=U_{dc}/t_{sA1}$.

When $U_{c21}$ reaches $U_{dc}$ and $U_{c11}$ reaches zero after a time interval $t_{sA1}$ (FIG. 3D), the portion of the auxiliary current $Ia_1$ exceeding the output current $I_{o1}$ turns on the diode $D_{11}$ and is called $I_{tA1}$ (FIGS. 4C and 4D). The switch $S_{11}$ may be turned on as soon as $U_{c21}$ has reached $U_{dc}$. The boosting time $t_{bA1}$ may preferably be set to a value that minimizes the current $I_{tA1}$ close to zero. This way the losses and the reverse recovery current of $D_{11}$ will be minimized, as well as the duration of the commutation. This strategy narrows the window $t_{tAx}$. Thus, the precise timing of $S_{11}$ turn-on is critical.

Because the diode $D_{11}$ and the switch $S_{11}$ clamp the output voltage to the positive dc potential P, the inductor current $I_{a1}$ decays linearly to zero during a time interval is $t_{tA}$ (FIG. 4C).

The current $I_{d11}$ decays first from $I_{tA1}$ to zero in time $t_{tAx}$, whereafter the switch current $I_{s11}$ increases linearly from zero to the load current level lot (FIG. 4F) while $I_{a1}$ continues to decrease from lot towards zero (FIG. 4C), after which the auxiliary diode Da21 turns off and the commutation sequence is finished.

The total duration of the commutation from the turn-on of the auxiliary switch $Sa_{21}$ to completion in mode A is $t_A=t_{bA1}+t_{sA1}+t_{tA1}$. There is a current in the auxiliary branch during this time interval.

As an example of the mode B, a commutation of the positive output current $I_{o1}$ (Io>0) from the upper main switch $S_{11}$ to the lower diode $D_{21}$ and a swing of the output voltage $U_o$ from N to P will described with reference to FIGS. 5A-5D.

The switch $S_{11}$ is conducting the output current $I_{o1}$ ($I_{o1}=I_{s11}$) (FIG. 5A) and switches $S_{21}$, $S_{a11}$ and $S_{a21}$ not conducting (turned off); during the commutation the upper switch $S_{11}$ turns off and the lower diode $D_{21}$ turns on. It shall be appreciated that FIGS. 5A-5D illustrate timing in the basic ARCP operation without a resonance swing time control according to embodiments of the invention. The effect of embodiments of the invention on the timing, especially on the turn-off time of the switch $S_{11}$ will be described further below.

The command for commutation arrives at time instant $t_{B0}$. In the basic ARCP, after a waiting time $t_{wB1}$, the auxiliary switch $S_{a21}$ is turned on, and boosting current $I_{bB1}$ (in negative direction in the inductor $L_1$, positive direction in $S_{11}$) is linearly built up for a nominal boosting time $t_{bB1}$ (FIG. 5B).

The boosting current adds on top of the load current in the switch $S_{11}$, which turns off a total current of $I_{s11}=I_{o1}+I_{bB1}$ at the end of the nominal boosting time $t_{bB1}$ (FIG. 5A) in the basic ARCP. The swing of $U_{c11}$ from zero to $U_{dc}$ starts (FIG. 5C). The output potential swing from P to N is a combination of the linear portion caused by $I_{o1}$ and a resonant portion caused by $I_{bB1}$. The duration of the swing is $t_{sB1}$ $$t_{sB1} = \sqrt{L_1 C}\left[\cos^{-1}\left(\frac{U_{c11} - U_{dc}}{\sqrt{L_1/C}\, I_{pB1}}\right) - \frac{\pi}{2} - \gamma\right], \quad (4)$$

where $I_{pB1}$ is the peak value of the resonant part of the inductor current, $$I_{pB1} = \sqrt{\frac{CU_{c11}^2}{L_1} + (I_{o1} - I_{bB1})^2}, \quad (5)$$

$\gamma$ is a phase angle, $$\gamma = \tan^{-1}\left(\frac{\sqrt{C/L_1}\, U_{c11}}{-I_{o1} + I_{bB1}}\right), \quad (6)$$

and $C=C_{11}+C_{21}$. The voltage change rate average is $du/dt=U_{dc}/t_{sB1}$.

The remaining current $I_{a1}$ in the inductance at the end of the swing adds initially on top of the output current $I_{o1}$ in the diode $D_{21}$ so that $I_{d21}=I_{o1}+I_{tB}$. The diode current decays linearly to the final value $I_o$, as the inductor current reaches zero again after time $t_{tB}$ (FIGS. 5B and 5D). The total duration of the commutation in mode B from the triggering of $S_a$ to completion is $t_B=t_{bB}+t_{sB}+t_{tB}$.

The descriptions above for modes A and B assumed a positive direction of $I_o$. The operation for a negative $I_o$ ($I_o<0$) is identical, just the roles of $S_{11}$ and $S_{21}$, $D_{11}$ and $D_{21}$, and $U_{c11}$ and $U_{c21}$ are swapped from mode A to mode B, and vice versa.

The ARCP commutation for a corresponding phase in the plurality of parallel-connected ARCP inverters, e.g., for the ARCP phase $V_1$ of the ARCP inverter INV1 and the ARCP phase $V_2$ of the ARCP inverter INV2, can be initiated by similar commutation commands at the same time instant, e.g., at the time instant to for mode A commutation and at the time instant $t_{Bo}$ for mode B commutation. In an ideal case, the output currents $I_{o1}$ and $I_{o2}$ of the parallel-connected ARCP inverters would be equal Unfortunately, the parallel operated inverters do not behave similarly, for example due to parameter differences of switch components and differing impedances in parallel branches. One problem is that there may be differential variations of the ARCP resonant circuit component characteristics between the parallel-connected ARCP-inverters, e.g., the ARCP inverters INV1 and INV2 in FIG. 2. For example, the (dynamic) inductances of the resonant inductors $L_1$ and $L_2$ may differ significantly. As another example, the turn-on characteristics of the auxiliary switching devices $Sa_{11}$, $Sa_{21}$ and $Sa_{12}$, $Sa_{22}$ or their gate drivers (differential delays between gating signals $Ga_{11}$, $Ga_{21}$ vs $Ga_{12}$, $Ga_{22}$) may differ significantly between the ARCP inverters INV1 and INV2. Any of these impairments will lead to different boost currents, resonant swing trajectories and resonant swing durations between the ARCP inverters INV1 and INV2, which, in turn, will give rise to circulating currents, i.e., unequal current sharing between the ARCP inverters INV1 and INV2.

Let us examine the problem by a simulation example where a N-to-P commutation in Mode A is carried out for a 600 $A_{rms}$ inverter (with positive output current $I_o>0$). The above impairments were modelled by injection of a 100 ns delay for gating signals $Ga_{12}$ and $Ga_{22}$ of the auxiliary switches $Sa_{12}$ and $Sa_{22}$ in the inverter INV2 relative to the gating signals $Ga_{11}$ and $Ga_{21}$ of the auxiliary switches $Sa_{11}$ and $Sa_{21}$ in the inverter INV1. In this simulation, the turn-off gating signals $G_{21}$ and $G_{22}$ of the main switches $S_{21}$ and $S_{22}$ were kept in synchrony, i.e., the start times of the resonant swing in the ARCP inverters INV1 and INV2 were identical, however not their durations. Thus, the gating signal $Ga_{11}$ of the auxiliary switch $Sa_{11}$ was turned on without delay in the ARCP inverter INV1, and the ARCP inverter INV1 had the entire boost time $t_{bA}$ for the buildup of the boost current $I_{a1}$. Due to the 100 ns delay in turning on gating signal $Ga_{12}$ of the auxiliary switch $Sa_{12}$, the ARCP inverter INV2 had less time for the buildup of the boost current Ia2. As a result, the boost current $I_{a2}$ in the inverter INV2 was 49 A lower compared to the boost current $I_{a1}$ in the ARCP inverter INV1, hence leading to a slower resonant swing with a 80 ns longer swing time duration in the ARCP inverter INV2 compared to the resonant swing of the ARCP inverter INV1. It was also observed that during the resonant swing the output current $I_{o1}$ increased by 21.6 A in the ARCP inverter INV1 and the output current $I_{o2}$ decreased by 24 A in the ARCP inverter INV2, i.e., the differential output current (e.g., $I_{do}=I_{o1}-I_{o2}$) between the ARCP half-bridge legs changed by 45.6 A ("circulating current") during the resonant swing.

Figure 6A:
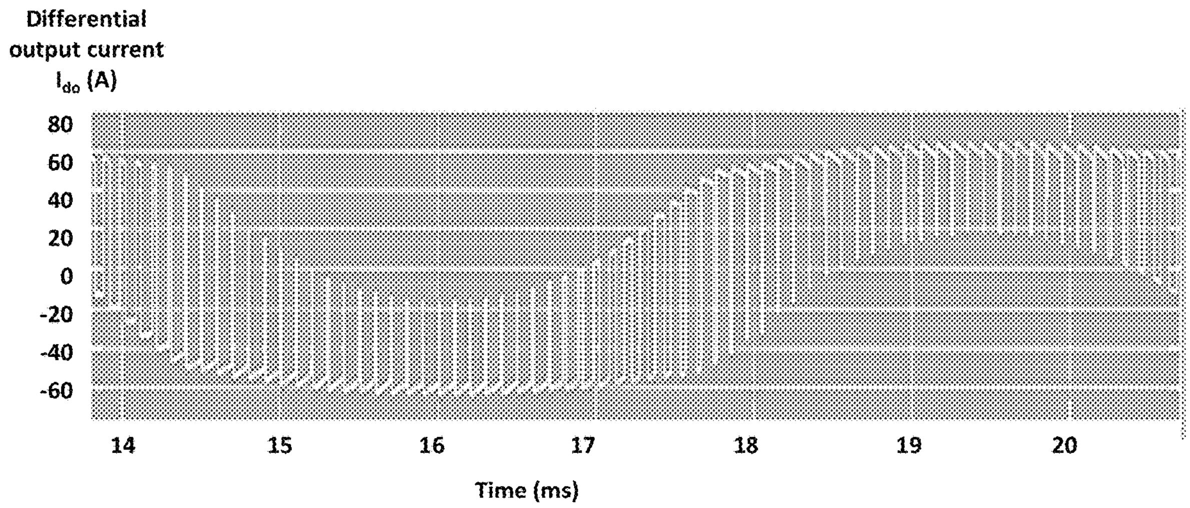
FIG. 6A illustrates differential output current of the ARCP inverters INV1 and INV2 over one period of the fundamental frequency, when a resonant swing time control is not used.

The different resonant swing trajectories in the ARCP inverter INV1 and the ARCP inverter INV2 result in differential voltages between the resonant capacitors $C_{11}$ vs $C_{12}$ and respectively $C_{21}$ vs $C_{22}$. These potential differences drive the buildup of the mentioned circulating currents during the resonant swing which are impeded only by the output impedances $L_{o1}$ and $L_{o2}$. However, as one of the major benefits of ARCP soft commutation is the inherently low rate of change du/dt of the converter output voltage, one would like to dispense with output filters which leaves the inductances $L_{o1}$ and Lo2 in the order of parasitic inductances (~1 μH) resulting in unacceptable high differential output currents. FIG. 6A illustrates the peak differential output currents $I_{do}$ in the order of 64 A between the ARCP inverters INV1 and INV2 over one period of the fundamental frequency ($f_{out}$=145 Hz) in the above simulation example. In other words, there was the 100 ns delay in turning on the gating signal $Ga_{12}$ of the auxiliary switch $Sa_{12}$ and the gating signal $Ga_{22}$ of the auxiliary switch $Sa_{22}$ in the ARCP inverter INV2, the continuous PWM (CPWM) frequency was 10 kHz, and $L_{o1}=L_{o2}$=1 μH.

Large differential output currents lead to different temperatures in the main switching devices $S_{11}/S_{12}$ and $S_{21}/S_{22}$ in in the ARCP inverter INV1 and the ARCP inverter INV2 and may require de-rating of the combined output current $I_o$ which is undesirable.

Clearly, it is desired to suppress such large circulating currents or differential output currents without adding output filters.

According to an aspect of the invention the ARCP resonant swing time is controlled to a reference value autonomously in each ARCP inverter leg by means of a closed loop feedback based on a measured resonant swing time duration.

In embodiments, the measured resonant swing time duration is obtained from signals which correspond to switching instants of main switching devices of the ARCP inverter leg. For example, the actual resonant swing time may be easily measured from the gating signals of the main switching devices.

In embodiments, the actual resonant swing time duration is compared against the reference value in order to obtain an error signal and a turn-on time of at least one auxiliary switching device of the ARCP inverter leg is modified in a direction that drives the error signal towards zero, i.e., controls the resonant swing time duration of the ARCP commutation towards a reference value of the resonant swing time.

In embodiments, control values are provided, based on an error between the actual resonant swing time duration and the reference value, to adjust a turn-on instant of at least one auxiliary switching device of the ARCP inverter leg earlier or later in time so that resonant swing time duration of ARCP commutations is controlled towards the reference value. In embodiments, the actual resonant swing time duration is compared against the reference value in order to obtain an error signal and a control value (e.g., a gate signal time delay value) is provided to be applied to modify the turn-on time of the at least one auxiliary switching devices and to thereby drive said error signal towards zero.

In embodiments, the control value (e.g., a gate signal time delay value) is provided by a controller having integral control behavior (i.e., integral (I) controller). The I-converter forms an integral of the error to provide the control value. In embodiments, the control values (e.g., delay values) are adjusted to vary around a nominal control value (e.g., a nominal delay value) according to the error, the nominal control value preferably corresponding to about a midpoint of a desired control range of the resonant swing time. Therefore, a turn-on instant of at least one auxiliary switching device of the ARCP inverter leg may be adjusted to be earlier or later relative to a nominal turn-on instant of the at least one auxiliary switching device so as to control the resonant swing time duration of ARCP commutations towards the reference value. When the control value is less than the nominal control value, the gating signal of the auxiliary switch is advanced, e.g., delayed less compared to the nominal control value. When the control value is more than the nominal control value, the gating signal of the auxiliary switch is postponed, e.g., delayed more compared to the nominal control value.

In embodiments, a boost time of each commutation of the ARCP inverter leg is increased by a period of time to give a control range for resonant swing time control. The period of time may correspond to about at least half of a desired control range of the resonant swing time.

In embodiments, the actual resonant swing time duration is measured, and the resonant swing duration control value is calculated from ARCP Mode A commutations only, as only Mode A has a constant swing time which is not affected by load currents. In embodiments, the control value obtained in the ARCP Mode A commutations is applied to the auxiliary switching devices also in ARCP Mode B commutations, as the component impairments (e.g., auxiliary IGBT turn-on characteristics) can be assumed to be similar.

In embodiments, a dedicated resonant swing time controller is provided for each ARCP inverter leg and configured to control the resonant swing time duration to the same reference value in all ARCP inverter legs of the inverter system. This ensures substantially identical resonant swing time durations between the parallel ARCP inverter legs and therefore facilitates equal current sharing.

In embodiments, the inverter a dedicated resonant swing time controller is provided for each parallel connected ARCP half-bridge leg and thereby control the resonant swing time duration to the same reference value in all parallel connected half-bridge legs of the ARCP converter The embodiments of the invention have various advantages. As the resonant swing time of the ARCP inverter leg is controlled in a closed loop (feedback), additional robustness of the ARCP commutation against component parameter uncertainties of the inverter is provided. Note that this improves a performance of a single inverter leg even for without having inverter legs connected in parallel. In case of parallel-connected inverter legs, embodiments of the inventions allow suppression of differential output currents by a simple control arrangement which is much cheaper to implement compared to adding an output filter. The control arrangement can be implemented with the same technology together with the other ARCP control functions of the ARCP inverter leg. In embodiments, the control arrangement may be implemented using Field Programmable Gate Arrays (FPGAs). The ARCP resonant swing time is controlled autonomously in each ARCP inverter leg, i.e., the ARCP resonant swing time control is carried out independently and concurrently in each ARCP inverter leg of the inverter system. No central coordination or communications across inverter legs is needed.

Figure 6B:
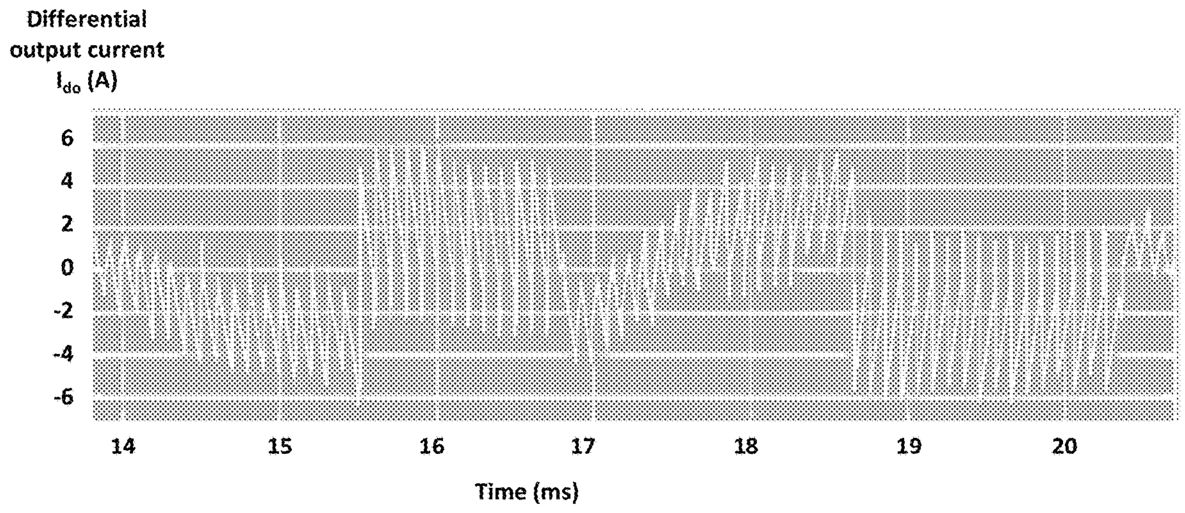
FIG. 6B illustrates differential output current of the ARCP inverters INV1 and INV2 over one period of the fundamental frequency, when a resonant swing time control is used.

FIG. 6B illustrates the differential output current $I_{do}$ between the ARCP inverters INV1 and INV2 over one period of the fundamental frequency when a swing time control according to the invention is simulated under the same conditions as in the simulation of FIG. 6A. The peak differential output current has been reduced to about 6 A which is only 10% of the original current difference in FIG. 6A.

Figure 7:
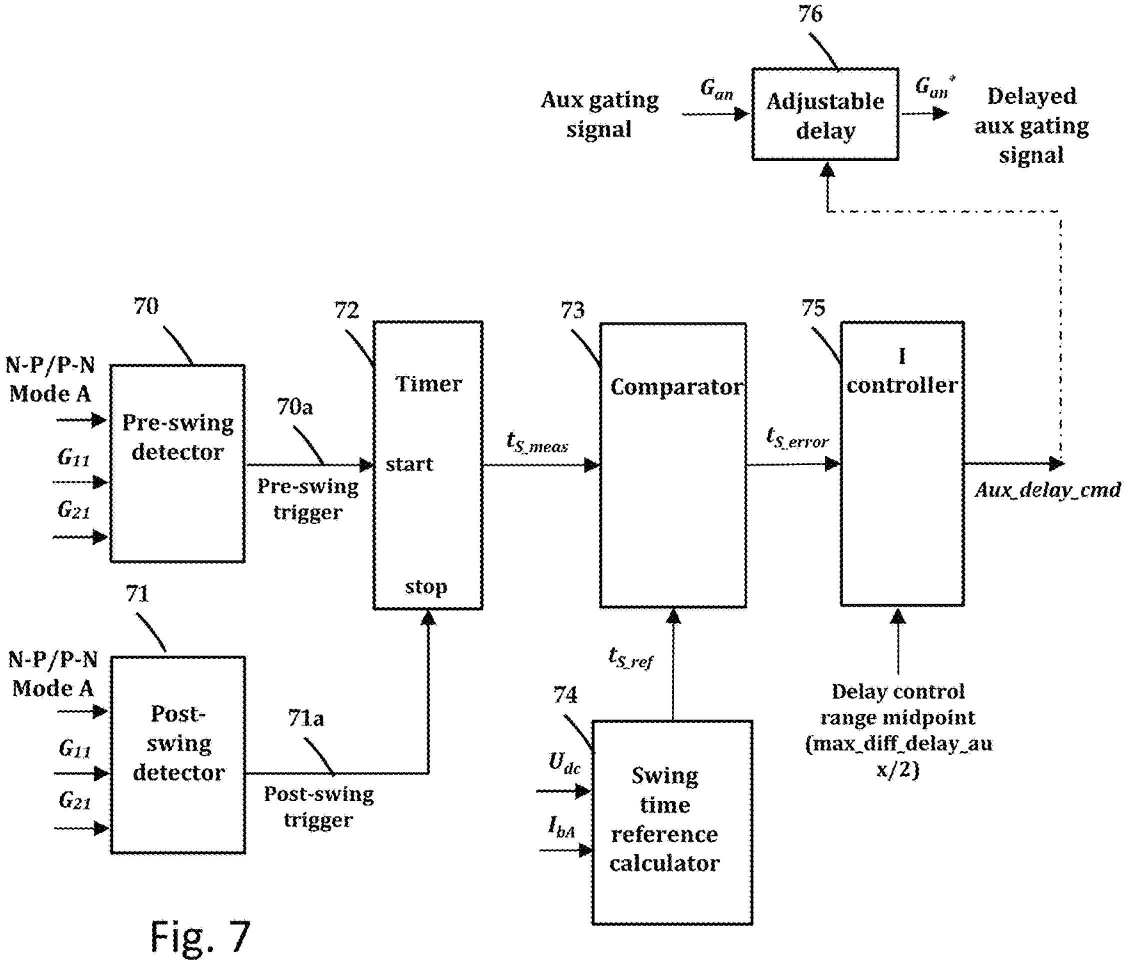
FIG. 7 is an exemplary functional block diagram of a resonant swing time controller logic according to an embodiment of the invention.

An exemplary functional block diagram of a resonant swing time controller logic according to an embodiment of the invention is illustrated in FIG. 7. In the example, the actual swing time duration is determined or measured by a pre-swing detector 70, a post-swing detector 71, and a timer 72. The pre-swing detector 70 and the post-swing detector 71 have inputs receiving the main switch gating signals $G_{11}$ and $G_{21}$, or signals representative of them. The pre-swing detector 70 and the post-swing detector 71 also takes into account whether a Mode A commutation is happening and also the direction of the commutation from the potential N to the potential P or from the potential P to the potential N. The resonant swing time duration is calculated from Mode A commutations only, as only Mode A has a constant swing time which is not affected by load currents. The detectors 70 and 72 may be disabled for Mode B commutations.

In Mode A commutation from N to P, the pre-swing detector 70 outputs a pre-swing trigger pulse 70$a$, when it detects from a change of the gating signal $G_{21}$ that the main switch $S_{21}$ is turned off at the end of the boosting interval $t_{bA1}$, and that the commutation swing of the output voltage $U_{c21}$ from N to P starts. The pre-swing trigger pulse 70$a$ starts a timer 72 to calculate the elapsed time of the resonant swing. The post-swing detector 71 outputs a post-swing trigger pulse 71$a$, when it detects from a change of the gating signal $G_{11}$ that the main switch Si is turned on at the end of the commutation swing of the output voltage $U_{c21}$. The post-swing trigger pulse 71$a$ stops the timer 72 which outputs the measured actual resonant swing time $t_{s\_meas}$.

Similarly, in Mode A commutation from P to N, the pre-swing detector 70 outputs a pre-swing trigger pulse 70$a$, when it detects from a change of the gating signal $G_{11}$ that the main switch $S_{11}$ is turned off at the end of the boosting interval $t_{bA1}$, and that the commutation swing of the output voltage $U_{c11}$ from P to N starts. The pre-swing trigger pulse 70$a$ starts a timer 72 to calculate the elapsed time of the resonant swing. The post-swing detector 71 outputs a post-swing trigger pulse 71$a$, when it detects from a change of the gating signal $G_{21}$ that the main switch $S_{21}$ is turned on at the end of the commutation swing of the output voltage $U_{c11}$. The post-swing trigger pulse 71$a$ stops the timer 72 which outputs the measured actual resonant swing time $t_{s\_meas}$.

A comparator 73 compares the actual resonant swing time $t_{s\_meas}$ with a swing time reference $t_{s\_ref}$ and outputs a swing time error signal $t_{s\_error}$ which represents the difference between the actual resonant swing time $t_{s\_meas}$ and a swing time reference $t_{s\_ref}$. The swing time error signal $t_{s\_error}$ is fed into an integral controller (I-controller) 75. In the exemplary embodiment, the I-controller 75 forms an integral of the error signal that is used for forming a delay control command aux_delay_cmd. The delay control command aux_delay_cmd is the actual delay used in the turn-on gating of the auxiliary switch $S_{a11}$ or $S_{a21}$. In embodiments, the I-controller 75 combines (sums) the integral of the error signal with a nominal midpoint delay (max_diff_delay_aux/2) to form the delay control command aux_delay_cmd. Thus, in embodiments, the I-controller effectively varies or modifies the turn-on delay of an auxiliary switch around the nominal midpoint delay (max_diff_delay_aux/2) within a maximum delay control range (max_diff_delay_aux). The delay control range max_diff_delay_aux is split around the nominal midpoint delay to allow for either increasing or decreasing the auxiliary switch turn-on from the nominal midpoint delay to meet the swing time reference $t_{s\_ref}$, i.e., to drive the swing time error signal $t_{s\_error}$ towards zero. Thereby, when the delay is decreased or increased from the nominal midpoint delay, the turn-on instant of the auxiliary switch is respectively advanced or delayed from the turn-on instant corresponding to the nominal midpoint delay. Consequently, the ARCP inverter has respectively more or less time for the buildup of the boost current, which respectively results in a higher or lower boost current, hence respectively leading to a faster resonant swing with a shorter swing time duration or to a slower resonant swing with a longer swing time duration in the ARCP inverter compared to the resonant swing corresponding to the nominal midpoint delay.

In the example shown in FIG. 7 the delay control command aux_delay_cmd is arranged to control an adjustable delay 76 which delays an input auxiliary gating signal $G_{an}$ (e.g., the gating signal $G_{a11}$ or $G_{a21}$) and outputs a delayed auxiliary gating signal $G_{an}$*. The delay control commands provided for mode A commutation by the swing time controller may be stored in the swing time controller or in another storage unit to be used in subsequent mode B commutations.

Figure 8:
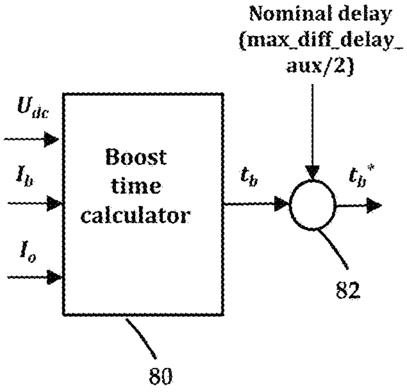
FIG. 8 is a functional block diagram showing a boost time calculator.

In embodiments, a nominal boost time to calculated for a commutation is delayed or shifted in time by the nominal delay (e.g., max_diff_delay_aux/2) to form an actual delayed boost time $t_b$*=nominal delay+$t_b$, as illustrated by an adder 80 in FIG. 8. The main switch, such as the main switch $S_{11}$ or the main switch $S_{21}$, is turned off at the end of the actual delayed boost time $t_b$*, and the turn-off timing of the main switch is not impacted by the varying auxiliary switch delays commanded by the swing time duration controller. The auxiliary switch delay merely controls the actual starting point of the boosting, i.e., the effective boost time, within the actual delayed boost time. In the example illustrated in FIG. 8, the calculated boost time to is provided by a boost time calculator 80 using, for example, the equation (7) for mode A commutations and the equation (8) for mode B commutations $$t_{bA} = (I_o + I_{bA})2L/U_{dc} \tag{7}$$

$$t_{bB} = -2LI_{bB}/U_{dc} \tag{8}$$

wherein L is a resonant inductor of the auxiliary circuit.

In embodiment, the swing time reference $t_{s\_ref}$ may be calculated from the dc-link voltage $U_{dc}$ and the boost current (reference) $I_{bA}$, e.g., by a swing time reference calculator 74 as illustrated in FIG. 7. The calculation of the swing time reference $t_{s\_ref}$ may be performed applying and implemented the equations (1), (2), and (3) above, for example. The capacitor voltage $U_{c21}$ may be replaced by $U_{dc}/2$ in the equations. The dc-link voltage $U_{dc}$ may be known (constant) or measured actual value.

Figure 9:
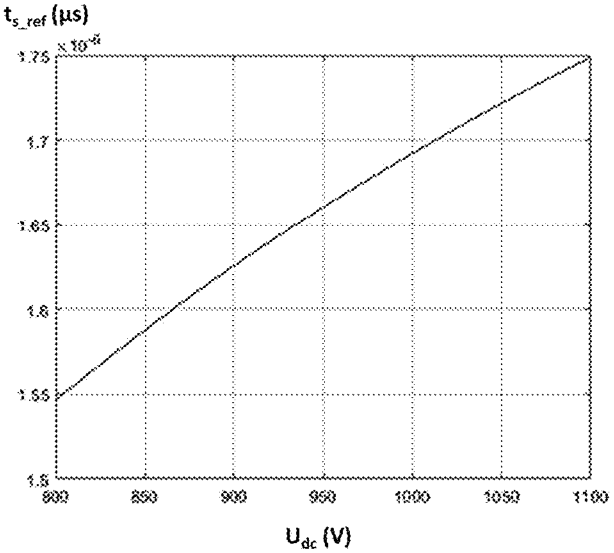
FIG. 9 is a plot showing an example of the swing time reference as function of a dc-link voltage for a constant boost current reference.

In embodiments using a typical ARCP boost time calculation particularly in logic implementations (such as Field Programmable Gate Array, FPGA), the target boost current $I_b$ is typically set to a constant value, regardless of $U_{dc}$. There is a caveat that $U_{dc}$ is not a constant. FIG. 9 is a plot showing an example of the swing time reference $t_{s\_ref}$ as function of $U_{dc}$ for a constant boost current $I_b$. If the value of the swing time reference $t_{s\_ref}$ is not calculated with the actual $U_{dc}$ then for low $U_{dc}$ values and a swing time reference $t_{s\_ref}$, the swing time controller may essentially reduce the actual boost current too much for a successful ARCP commutation, and the delay the control range gets consumed in compensating for the $U_{dc}$ variation.

Therefore, in embodiments of the invention, particularly in logic or FPGA implementations, the swing time reference calculator 7 approximates the swing time reference $t_{s\_ref}$ using an actual measured value of the dc-link voltage $U_{dc}$ with some readily available approximation means, such as a lookup table indexed by $U_{dc}$ values, linear interpolation, approximation of transcendental functions, etc. The resulting swing time reference will thus "breathe" with varying $U_{dc}$ but stay in synchronism among the parallel ARCP half-bridge legs.

Figure 10:
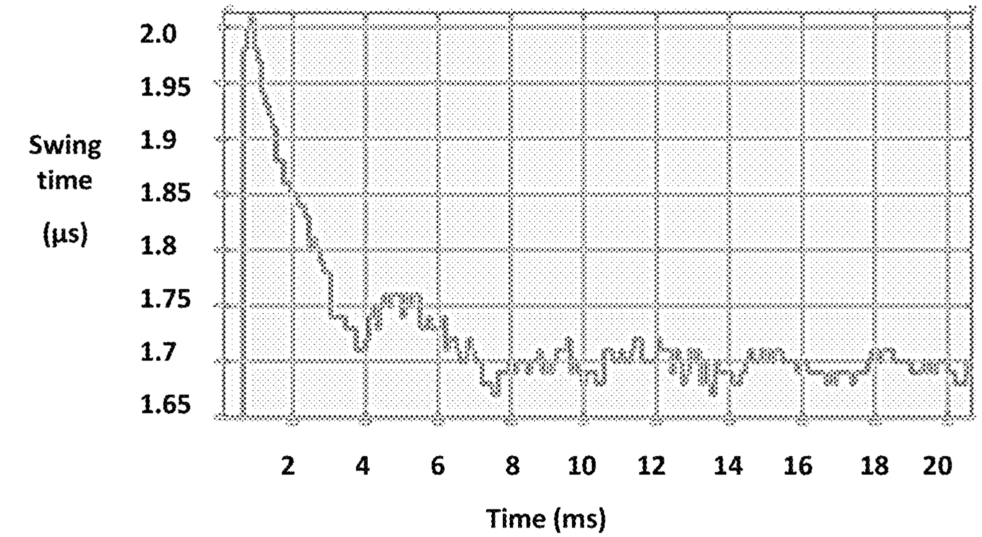
FIG. 10 is a graph showing the behavior of the swing time during a swing time control in the inverter leg INV2.
Figure 11:
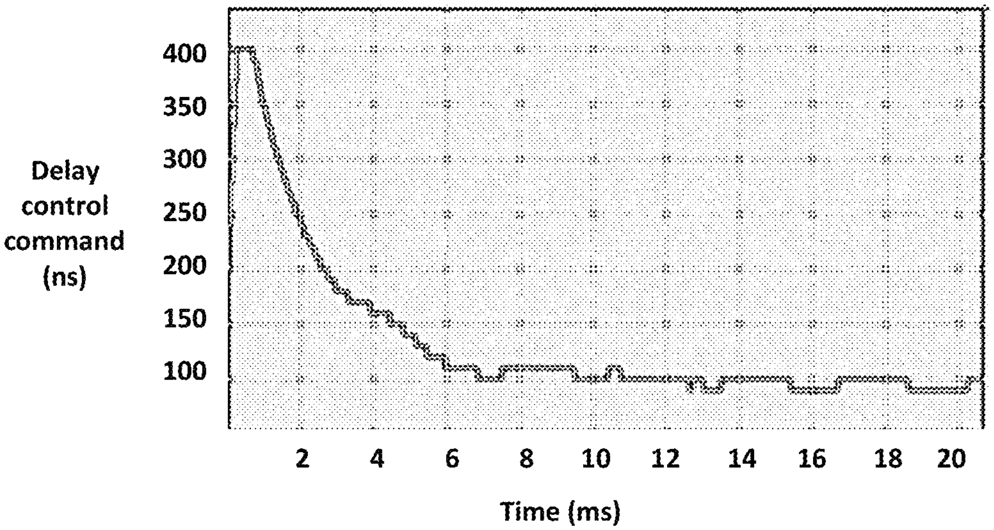
FIG. 11 is a graph showing the behavior of the corresponding delay control command value during a swing time control in the inverter leg INV2.

With the circuit parameters of the above simulation case and Udc=1000 V the above equations will give the swing time reference $t_{s\_ref}$=1.6953 μs. FIG. 10 is a graph that shows how the swing time controller drives the swing time to this reference value after some initial transients at the start of the simulation. FIG. 11 shows the corresponding delay control command used in the turn-on gating of the auxiliary switches in the inverter leg INV2. After an initial transient the I-control settles on the value 100 ns. In other words, there is an advancement by 100 ns relative to the nominal midpoint (=200 ns) in turning on auxiliary switches $S_{a12}$ and $S_{a22}$. This control action has fully compensated the externally injected 100 ns delay in turning on auxiliary switches $S_{a12}$ and $S_{a22}$. No such compensation was needed in the inverter leg INV1, where the measured swing time would immediately be equal to the swing time reference, the swing time error would be zero and the delay control command would be zero. In summary, as a result of controlling the ARCP resonant swing times to the same reference value in parallel connected ARCP inverter legs, the differential output peak currents have been essentially reduced or eliminated, as illustrated in FIG. 6B.

The switching control and swing time control techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related drawings are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A power converter system, comprising:

an auxiliary resonant commutated pole (ARCP) converter leg, particularly an ARCP half-bridge, a resonant swing time controller for the ARCP converter leg, the resonant swing time controller being configured to control a resonant swing time duration of ARCP commutations to a reference value of the resonant swing time duration by means of a closed loop feedback of an actual resonant swing time duration.

2. The power converter system as claimed in claim 1, wherein the resonant swing time controller is, configured to provide, based on an error between the actual resonant swing time duration and the reference value, control values to adjust a turn-on instant of at least one auxiliary switching device of the ARCP converter leg earlier or later in time so that resonant swing time duration of ARCP commutations is controlled towards the reference value.

3. The power converter system as claimed in claim 2, wherein the resonant swing time controller is configured to form an integral of the error to provide the control values.

4. The power converter system as claimed in claim 2, wherein the resonant swing time controller is configured to vary the control values around a nominal control value based on the error, the nominal control value preferably corresponding to about a midpoint of a desired control range of the resonant swing time.

5. The power converter system as claimed in claim 2, wherein the resonant swing time controller is configured to adjust a turn-on instant of at least one auxiliary switching device of the ARCP converter leg earlier or later relative to a nominal turn-on instant of the at least one auxiliary switching device.

6. The power converter system as claimed in claim 2, wherein the resonant swing time controller is configured to provide the control values based on ARCP Mode A commutations and to apply the same control values for both ARCP Mode A commutations and ARCP Mode B commutations.

7. The power converter system as claimed in claim 1, wherein the resonant swing time controller is configured to measure the actual resonant swing time duration from switching instants of main switching devices of the ARCP converter leg in ARCP Mode A commutations, preferably from gating signals of the main switching devices.

8. The power converter system as claimed in claim 1, wherein the resonant swing time controller is configured to calculate the resonant swing time reference based on an ARCP Mode A boost current and a dc-link voltage of the ARCP converter leg.

9. The power converter system as claimed in claim 1, wherein the resonant swing time controller is configured to define the resonant swing time reference based on an actual measured dc-link voltage of the ARCP converter leg.

10. The power converter system as claimed in claim 1, comprising a plurality of ARCP converter legs and a plurality of resonant swing time controllers, one for each ARCP converter leg, and wherein the resonant swing time controllers control the resonant swing time duration towards essentially a same reference value in all ARCP converter legs of the converter system.

11. The power converter system as claimed in claim 1, comprising a plurality of ARCP converter legs connected in parallel between a common system and a common ac system or two common dc systems, wherein commutations of the parallel-connected ARCP converter legs are initiated by simultaneous commutation commands, a plurality of resonant swing time controllers, one for each parallel-connected ARCP converter leg, and wherein the resonant swing time controllers control the resonant swing time duration towards essentially a same reference value in all parallel-connected ARCP converter legs of the converter system.

12. The power converter system as claimed in claim 1, wherein the power converter system comprises two or more ARCP converters, each of the ARCP converters comprising one or more ARCP converter legs, wherein the parallel-connected ARCP converter legs are the corresponding ARCP converter legs of the two or more converters connected in parallel.

13. The power converter system as claimed in claim 1, wherein each of said ARCP converter legs comprises:

a series connection of at least two main switching devices between a positive dc-link potential and a negative dc-link potential to alternatively connect the positive and negative dc-link potential to a converter leg output, and a series connection of a resonant inductance and at least one bi-directional auxiliary switch between said converter leg output and a dc-link neutral point.

14. A power converter system, comprising:

an auxiliary resonant commutated pole (ARCP) converter leg, particularly an ARCP half-bridge, a resonant swing time controller for the ARCP converter leg, the resonant swing time controller being configured to control a resonant swing time duration of ARCP commutations to a reference value of the resonant swing time duration by means of a closed loop feedback of an actual resonant swing time duration, and wherein the resonant swing time controller is configured to provide, based on an error between the actual resonant swing time duration and the reference value, control values to adjust a turn-on instant of at least one auxiliary switching device of the ARCP converter leg earlier or later in time so that the resonant swing time duration of ARCP commutations is controlled towards the reference value.

15. A power converter system, comprising:

a plurality of auxiliary resonant commutated pole (ARCP) converter legs, particularly ARCP half-bridges, a plurality of resonant swing time controllers, one for each of the plurality of the ARCP converter legs, each resonant swing time controller being configured to control a resonant swing time duration of ARCP commutations in the respective ARCP converter leg to a reference value of the resonant swing time duration by means of a closed loop feedback of an actual resonant swing time duration of the respective ARCP converter leg, and wherein the resonant swing time controllers are configured to control the resonant swing time duration towards essentially a same reference value in all of the plurality of ARCP converter legs.

* * * * *